(12) United States Patent
Sudoh

(10) Patent No.: US 7,748,641 B2
(45) Date of Patent: Jul. 6, 2010

(54) LINKING DEVICE HAVING CONNECTING MEMBER WITH THERMAL DEFORMATION ABSORBING STRUCTURE

(75) Inventor: Tomohiro Sudoh, Okazaki (JP)

(73) Assignee: DENSO Corporation, Kariya (JP)

( * ) Notice: Subject to any disclaimer, the term of this patent is extended or adjusted under 35 U.S.C. 154(b) by 484 days.

(21) Appl. No.: 11/890,709

(22) Filed: Aug. 7, 2007

(65) Prior Publication Data

US 2008/0035745 A1 Feb. 14, 2008

(30) Foreign Application Priority Data

Aug. 9, 2006 (JP) ............................. 2006-217305

(51) Int. Cl.
*G05D 23/02* (2006.01)
(52) U.S. Cl. .................. 236/101 R; 236/96; 236/101 E
(58) Field of Classification Search ............ 236/101 R, 236/101 E, 96; 188/79.52, 276; 464/51, 464/106, 147, 902; 267/DIG. 1
See application file for complete search history.

(56) References Cited

U.S. PATENT DOCUMENTS

| | | | | |
|---|---|---|---|---|
| 3,799,432 A | * | 3/1974 | Schneider | 236/48 R |
| 6,367,281 B1 | * | 4/2002 | Hugenroth | 62/467 |
| 2006/0201149 A1 | * | 9/2006 | Biggs et al. | 60/527 |

FOREIGN PATENT DOCUMENTS

JP 2001-158227 6/2001

* cited by examiner

*Primary Examiner*—Frantz F. Jules
*Assistant Examiner*—Daniel C Comings
(74) *Attorney, Agent, or Firm*—Harness, Dickey & Pierce, PLC

(57) ABSTRACT

A linking device has a connecting member for connecting a first rotation member and a second rotation member. The connecting member is connected to the first rotation member at a first connecting point and to the second rotation member at a second connecting point. The connecting member includes a thermal deformation absorbing part between the first connecting point and the second connecting point, and is adapted to absorb a change of distance between the first connecting point and the second connecting point due to thermal deformation.

12 Claims, 4 Drawing Sheets

LINKING DEVICE HAVING CONNECTING MEMBER WITH THERMAL DEFORMATION ABSORBING STRUCTURE

CROSS REFERENCE TO RELATED APPLICATION

This application is based on Japanese Patent Application No. 2006-217305 filed on Aug. 9, 2006, the disclosure of which is incorporated herein by reference.

FIELD OF THE INVENTION

The present invention relates to a linking device, which is used, for example, for controlling doors of an air conditioning unit. More particularly, the present invention relates to a structure of a connecting member of the linking device.

BACKGROUND OF THE INVENTION

In general, an air conditioning unit has doors for opening and closing openings, and such doors are operated through a linking device. For example, the linking device is constructed of resinous linking members, such as motor levers, an intermediate plate, rotation plates and a connecting plate (connecting member) that connects the rotation plates, so as to reduce weight and costs.

In a vehicle, the air conditioning unit is used in a condition in which ambient temperature widely changes from low temperature such as −30° C. to high temperature such as 80° C. The linking device needs to operate appropriately irrespective to the change of the ambient temperature. However, the resinous linking members are likely to thermally expand under high temperature.

FIG. 7A shows an example of a connecting plate 133, which is one of the linking members, under ordinary temperature. FIG. 7B shows the connecting plate 133 under high temperature. The connecting plate 133 is connected to the other linking members, such as the rotation plates, at connecting points 133c, 133d. When the connecting plate 133 is affected by heat, the length of the connecting plate 133 increases due to thermal expansion. That is, a distance D2 between the two connecting points 133c, 133d under the high temperature is greater than a distance D1 under the ordinary temperature.

The connecting plate 133 is generally relatively longer than the other linking members. Thus, the increase of the length of the connecting plate 133 due to thermal expansion is larger than those of the other linking members. If the door levers, which are connected to the doors, receive stress due to the thermal expansion of the connecting plate, the doors will be twisted. As a result, it will be difficult to sufficiently seal the openings by the doors.

SUMMARY OF THE INVENTION

The present invention is made in view of the foregoing matter, and it is an object of the present invention to provide a linking device having a connecting member that has a structure capable of absorbing a change of dimension thereof due to thermal expansion.

According to an aspect of the present invention, a linking device for operating doors of an air conditioning unit includes a first rotation member, a second rotation member and a connecting member for connecting the first rotation member and the second rotation member. The connecting member includes a first connecting portion connected to the first rotation member, a second connecting portion connected to the second rotation member and a thermal deformation absorbing part between the first connecting portion and the second connecting portion. The thermal deformation absorbing part is configured to absorb a change of distance between the first and second connecting portions due to thermal deformation.

Accordingly, even when the connecting member is affected by heat, a change of dimension with heat is absorbed by the thermal deformation absorbing part. That is, the distance between the first and second connecting portions is maintained even when the connecting member is heated. Therefore, stress to the rotation members due to thermal expansion of the connecting member will be reduced. For example, the thermal deformation absorbing part is constructed of a member that is deformable with heat, such as a bimetallic piece and a shape memory material.

According to another aspect of the present invention, a linking device for operating doors of an air conditioning unit includes a first rotation member, a second rotation member, and a connecting member connecting the first rotation member and the second rotation member. The connecting member has a first connecting point connected to the first rotation member and a second connecting point connected to the second rotation member. The connecting member is made of a shape memory material and is adapted to absorb a change of a distance between the first connecting point and the second connecting point due to heat.

Namely, when the connecting member is heated, it changes a shape so that the distance between the first connecting point and the second connecting point is maintained. As such, even when the connecting member is affected by heat, stress to the first and second rotation members will be reduced.

According to yet another aspect of the present invention, a linking device, which is for transmitting a driving force to objects to be driven, includes a first linking member for transmitting the driving force toward at least one of the objects, a second linking member for transmitting the driving force toward at least another one of the objects, and a third linking member for connecting the first linking member and the second linking member. The third linking member includes a first connecting part, a second connecting part and a thermal deformation absorbing part between the first connecting part and the second connecting part. The first connecting part includes a first connecting point and is connected to the first linking member at the first connecting point. The second connecting part includes a second connecting point and is connected to the second linking member at the second connecting point. The thermal deformation absorbing part is deformable with heat and is configured to absorb a change of a distance between the first and second connecting points due to thermal deformation of the first and second connecting parts by deformation thereof.

Accordingly, even when the linking device is affected by heat, the change of the distance between the first and second connecting points due to thermal deformation of the first and second connecting parts is maintained within a predetermined range. As such, stress to objects operated by the linking device will be reduced.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXEMPLARY EMBODIMENTS

First Embodiment

Figure 1:
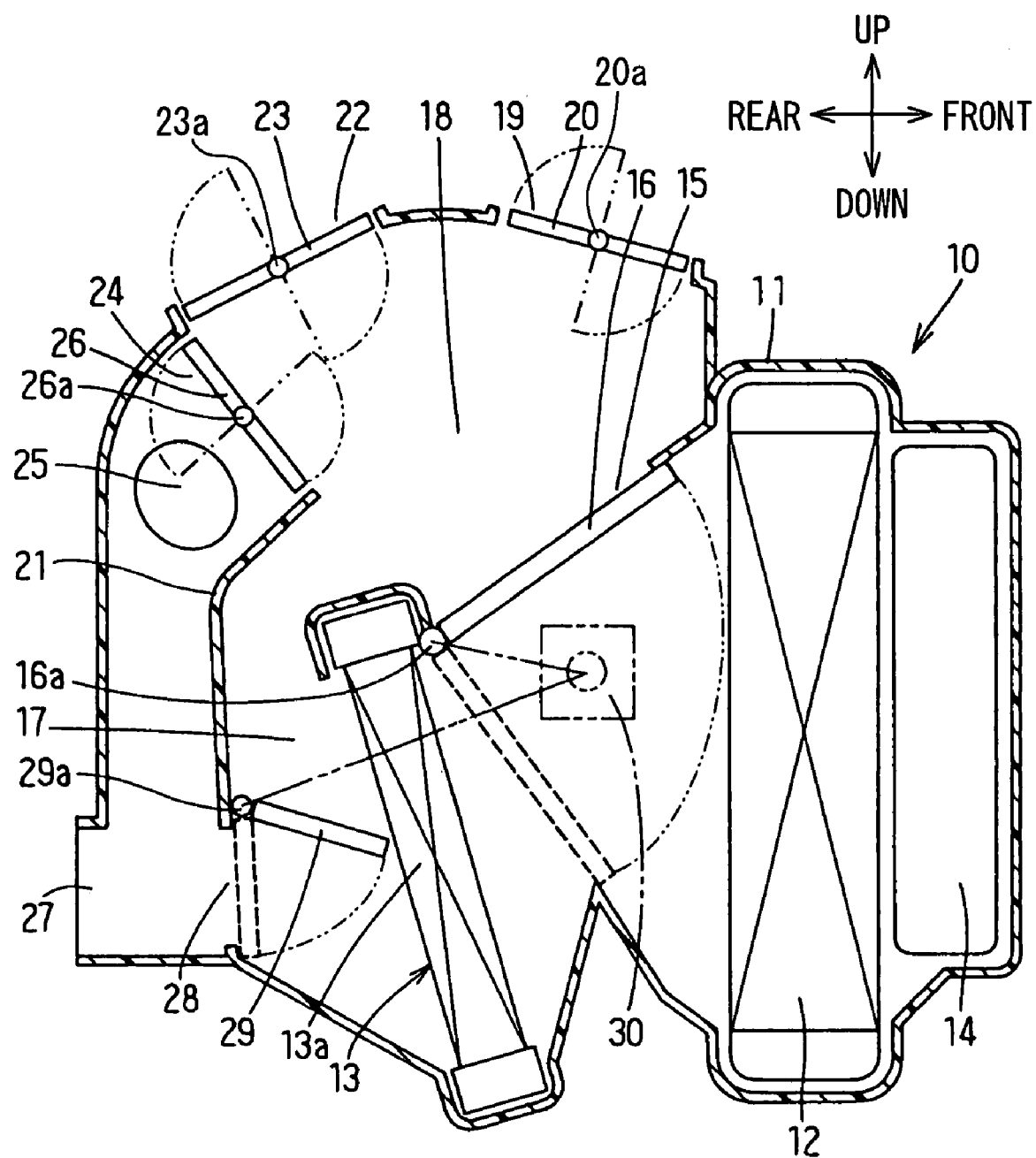
FIG. 1 is a schematic cross-sectional view of an air conditioning unit for a vehicular air conditioning apparatus according to a first embodiment of the present invention.

A first embodiment of the present invention will now be described with reference to FIGS. 1 to 4. FIG. 1 shows an air conditioning unit 10 for a vehicular air conditioning apparatus. In FIG. 1, an up and down arrow and a front and rear arrow denote respective directions when the air conditioning unit 10 is mounted on a vehicle.

The air conditioning apparatus is mounted in a space defined by an instrument panel at a front part of a passenger compartment of a vehicle. Although not illustrated, the air conditioning apparatus has a blower unit for supplying a flow of air toward the air conditioning unit 10. The air conditioning apparatus is arranged, for example, in a semi-center layout in the space so that the air conditioning unit 10 is mounted in a substantially middle position with respect to a vehicle right and left direction and the blower unit is offset from the air conditioning unit 10 to a side opposite to a driver's seat.

The blower unit generally has an inside/outside air switching box, which selectively draws inside air and outside air as well-known, and an electric multi-blade centrifugal fan for blowing the air drawn from the inside/outside air switching box toward the air conditioning unit 10.

As shown in FIG. 1, the air conditioning unit 10 generally has an air conditioning case 11, an evaporator 12 and a heater core 13. The evaporator 12 and the heater core 13 are housed in the case 11. The case 11 is made of a resin, such as a polypropylene, having elasticity and strength. In the case 11, an air passage is formed such that air generally flows in a vehicle rearward direction.

The case 11 has an air inlet port 14 at a front-most portion of a side wall thereof, which faces the blower unit. The case 11 is in communication with the blower unit through the air inlet port 14. Thus, the air blown from the blower unit is introduced into the case 11 through the air inlet port 14.

The evaporator 12 is arranged downstream of the air inlet port 14 with respect to the flow of air in the case 11. The heater core 13 is arranged downstream of the evaporator 12 with respect to the flow of air in the case 11. In other words, the heater core 13 is arranged on a rear side of the evaporator 12 with respect to the vehicle front and rear direction.

The evaporator 12 is a cooling heat exchanger that performs heat exchange between the air and an internal fluid such as a refrigerant of a refrigerating cycle, thereby to cool the air. In the heater core 13, heated fluid having a high temperature flows inside of the heater core 13, as an internal fluid. The heated fluid is for example an engine cooling water. The heater core 13 is a heating heat exchanger that heats cooled air, which has been cooled through the evaporator 12, using heat of the internal fluid.

The case 11 forms a cooled air bypass passage 15 through which the cooled air bypasses the heater core 13, above the heater core 13. An air mixing door 16 having a plate-like shape is arranged immediately downstream of the evaporator 12 with respect to a flow of cooled air, e.g., on the rear side of the evaporator 12, as an air temperature controlling door.

The air mixing door 16 is rotatable about a rotation shaft 16a so as to adjust the volume of cooled air flowing into the cooled air bypass passage 15 and the volume of cooled air to be introduced toward a core part 13a of the heater core 13 for heating. Thus, the temperature of air to be introduced into the passenger compartment is controlled to a desired temperature by adjusting the position of the air mixing door 16. In other words, the air mixing door 16 serves as a temperature control means for controlling the temperature of air to be introduced into the passenger compartment.

The case 11 further forms a heated air passage 17 immediately downstream of the heater core 13 with respect to a flow of a heated air. The heated air passage 17 extends in a generally upward direction. Thus, the heated air from the heated air passage 17 and the cooled air flowing from the cooled air bypass passage 15 merge with each other in an air mixing space 18 defined above the heater core 13.

The case 11 has openings such as a defroster opening 19, a face opening 22, and a foot opening, at generally downstream positions with respect to the flow of air. For example, the defroster opening 19 is formed on an upper wall of the case 11 and at a substantially middle position with respect to the vehicle front and rear direction. The defroster opening 19 is in communication with defroster air blowing ports through defroster ducts (not shown). Thus, the air, such as heated air, flowing in the defroster ducts from the defroster opening 19 is blown toward a windshield of the vehicle, so as to defrost the windshield.

The face opening 22 is formed on the upper wall of the case 11 and on the rear side of the defroster opening 19 with respect to the vehicle front and rear direction. The face opening 22 is in communication with face air blowing ports through face ducts (not shown). Thus, the air, such as cooled air, flowing in the face ducts from the face opening 22 is blown toward upper areas of passenger seats.

The foot opening 24 is formed under the face opening 22 within the case 11. The case 11 further has front foot air blowing ports on right and left side walls thereof and a rear foot air blowing port 27 on a rear lower position. The foot opening 24 is in communication with the front foot air blowing ports 25 and the rear foot air blowing port 27.

The air, such as heated air, introduced to the front foot air blowing ports 25 is generally blown toward lower areas of front passenger seats. Also, the air such as heated air, introduced to the rear foot air blowing port 27 is generally blown toward lower areas of rear passenger seats through rear foot ducts (not shown).

The case 11 has a defroster door 20, a face door 23 and a foot door 26 as air-blowing mode switching doors. The defroster door 20 is a plate door and is rotatable about a rotation shaft 20a to open and close the defroster opening 19. The face door 23 is a plate door and is rotatable about a rotation shaft 23a to open and close the face opening 22. Also, the foot door 26 is a plate door and is rotatable about a rotation shaft 26a to open and close the foot opening 24.

The case 11 has a separation wall 21 at an immediately downstream position of the heater core 13 with respect to the flow of heated air, such as on the rear side of the heater core 13. The separation wall 21 is formed with a heated air bypass opening 28 through which the heated air from the heater core 13 bypasses the air mixing space 18. The heated air bypass opening 28 is opened and closed by a heated air bypass door 29 as an air temperature controlling door. The heated air bypass door 29 is a plate door and is rotatable about a rotation shaft 29a.

The air mixing door 16 and the heated air bypass door 29 are operated together by an air temperature control linking device (first linking device) that is provided outside of the case 11. For example, in a maximum heating mode in which the air mixing door 16 is operated to a position where the cooled air bypass passage 15 is fully closed, such as a position shown by a solid line in FIG. 1, the heated air bypass door 29 is operated to a position where the heated air bypass opening 28 is fully open, such as a position shown by a solid line in FIG. 1. As such, in the maximum heating mode, the air having passed through the evaporator 12 is fully introduced toward the heater core 13 and further the heated air is partly directly introduced toward the heated air bypass opening 28. Accordingly, the volume of heated air introduced toward the rear foot air blowing port 27 increases.

In the example shown in FIG. 1, the openings 15, 19, 22, 24 28 are opened and closed by the doors 16, 20, 23, 26, 29, respectively. However, the above structure may be modified. For example, the defroster opening 19 and the face opening 22 may be opened and closed by a single door. Alternatively, the face opening 22 and the foot opening 24 may be opened and closed by a single door.

An end of the rotation shaft 16a of the air mixing door 16 and an end of the rotation shaft 29a of the heated air bypass door 29 passes through the side wall of the case 11 and project outside of the case 11. The ends of the rotation shafts 16a, 29a are coupled to an air temperature controlling actuator 30 as a driving device through the first linking device. As such, the doors 16, 29 are operated by the air temperature controlling actuator 30 through the first linking device.

An end of the rotation shaft 20a of the defroster door 20, an end of the rotation shaft 23a of the face door 23 and an end of the rotation shaft 26a of the foot opening 24 extend through the side wall of the case 11 and project outside of the case 11. The ends of the rotation shafts 20a, 23a, 26a are coupled to a mode switching actuator (not shown) through a mode switch linking device (second linking device, not shown). As such, the doors 20, 23, 26 are operated by the mode switching actuator.

In this embodiment, for example, the actuator 30 is constructed of a d.c. motor (servomotor) that has a position detecting element for detecting a rotational position of an output shaft. The d.c. motor is also capable of controlling the output shaft to a predetermined rotational position and rotatable in both directions. Alternatively, the actuator 30 may be constructed of another device, such as a step motor that can control an output shaft to a predetermined rotational position according to the number of input pulses.

Next, a structure of the first linking device will be described with reference to FIG. 2.

Figure 2:
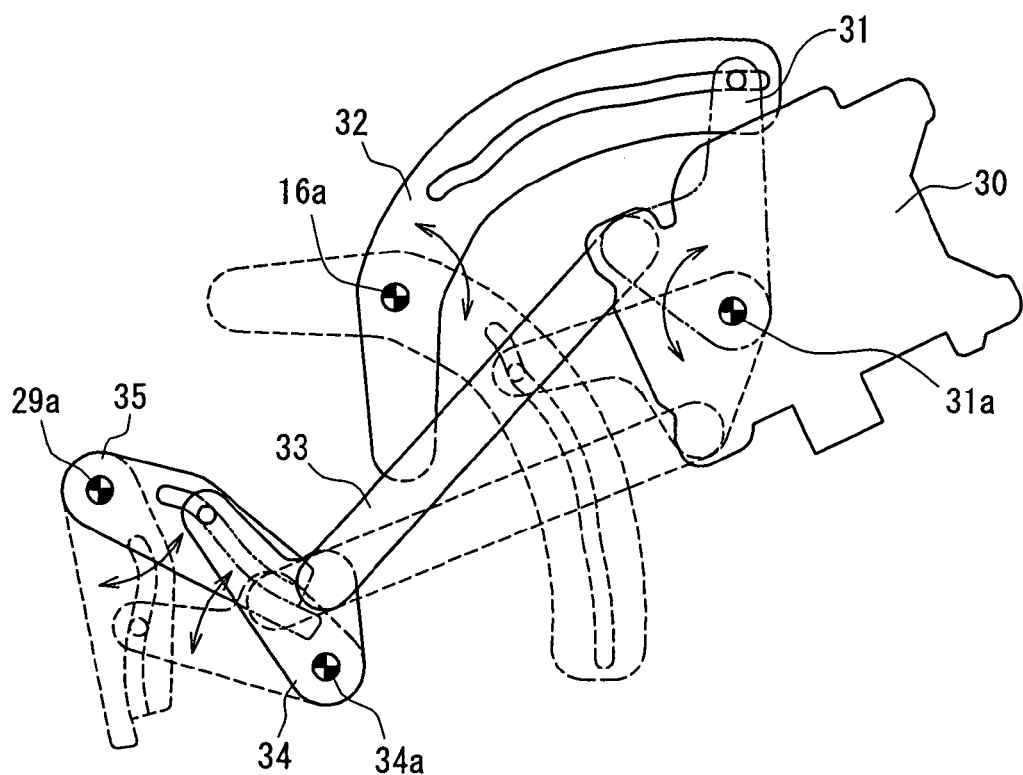
FIG. 2 is a schematic view of an air temperature control linking device of the air conditioning unit according to the first embodiment.

As shown in FIG. 2, the first linking device includes a motor lever (first rotation member) 31 as a first linking plate. The motor lever 31 receives a driving force from the servomotor 30 through a rotation shaft 31a and is rotatable about a rotation shaft 31a. The motor lever 31 transmits the driving force to two driving systems for driving the air mixing door 16 and the heated air bypass door 29.

As the first driving system, the first linking device includes an air mixing door lever 32 as a second linking plate. The air mixing door lever 32 is coupled to the rotation shaft 16a of the air mixing door 16 and is rotatable about an axis of the rotation shaft 16a. The air mixing door lever 32 is engaged with the motor lever 31, for example, through a pin and a groove, and is movable with the motor lever 31. Namely, as the motor lever 31 rotates, the air mixing door lever 32 rotates the air mixing door 16.

As the second driving system, the first linking device further includes an intermediate plate (second rotation member) 34 as a third linking plate and a heated air bypass door lever 35 as a fourth linking plate. The intermediate plate 34 is rotatable about a rotation shaft 34a. The heated air bypass door lever 35 is coupled to the rotation shaft 29a of the heated air bypass door 29 and is rotatable about an axis of the rotation shaft 29a.

The intermediate plate 34 is coupled to the motor lever 31 through a connecting plate 33 as a link connecting member and is movable with the motor lever 31 through the connecting plate 33. The intermediate plate 34 is configured to transmit the movement of the motor lever 31 to the heated air bypass door lever 35 in an increased manner.

The heated air bypass door lever 35 is engaged with the second rotation plate 34, for example, through a pin and a groove, and is movable with the second rotation plate 34. Namely, as the intermediate plate 34 is rotated by the motor lever 31 through the connecting plate 33, the heated air bypass door lever 35 rotates the heated air bypass door 29.

Thus, the motor lever 31, the air mixing door lever 32, the connecting plate 33, the intermediate plate 34 and the heated air bypass door lever 35 are movable between a first position shown by solid lines and a second position shown by dashed lines in FIG. 2 with the operation of the servomotor 30. The preceding linking members 31, 32, 33, 34, 35 are formed of a resin such as polypropylene (PP) or polyacetal (POM) and by injection molding, for example.

Figures 3A, 3B:
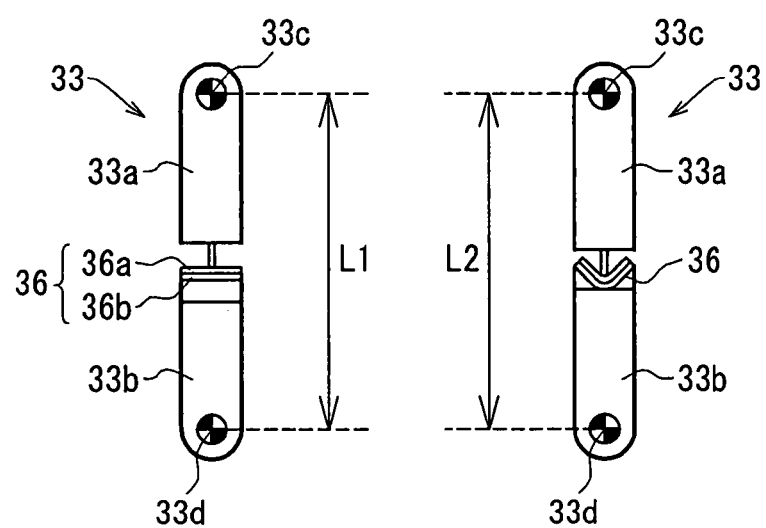
FIG. 3A is a schematic plan view of a connecting plate of the linking device, under ordinary temperature, according to the first embodiment.
FIG. 3B is the schematic plan view of the connecting plate, under high temperature, according to the first embodiment.

Next, a structure of the connecting plate 33 will be described in more detail with reference to FIGS. 3A and 3B. FIG. 3A shows the connecting plate 33 under ordinary temperature and FIG. 3B shows the connecting plate 33 under high temperature.

As shown in FIG. 3A, the connecting plate 33 includes a first plate part 33a, a second plate part 33b and a bimetallic member 36 between the first and second plate parts 33a, 33b as a thermal deformation absorbing part for absorbing a dimensional change of the coupling plate 33 due to thermal deformation, such as thermal expansion, of the first and second plate parts 33a, 33b. The first plate part 33a is connected to one of the motor lever 31 and the intermediate plate 34 at a first connecting point 33c and the second plate part 33b is connected to the other one of the motor lever 31 and the intermediate plate 34 at a second connecting point 33d.

The bimetallic member 36 includes a bimetallic strip having a first metallic piece 36a and a second metallic piece 36b, which are made of metals having different coefficients of liner expansion. The first and second metallic pieces 36a, 36b are formed by adding additives, such as manganese, chromium and copper, with an alloy of iron and nickel, and thus expand at different rates as heated. The first and second metallic pieces 36a, 36b are joined with each other throughout their length by cold rolling or the like.

An end of the first plate part 33a, which is opposite to an end having the first connecting point 33c, is connected to a substantially middle portion of the first metallic piece 36a with respect to a length of the bimetallic member 36. An end of the second plate part 33b, which is opposite to an end having the second connecting point 33d, is connected to ends of the second metallic piece 36b with respect to the length of the bimetallic member 36.

For example, spaces are provided between the ends of the first and second plate parts 33a, 33b and the first and second metallic pieces 36a, 36b, respectively, as shown in FIG. 3A. The first plate part 33a has an extension at the end. The extension connects to the substantially middle portion of the first metallic piece 36a across a space. The second plate part 33b has extensions at the end. The extensions connect to the ends of the second metallic piece 36b across a space.

For example, the second metallic piece 36b has a coefficient of liner expansion greater than that of the first metallic piece 36a. When an ambient temperature increases from the ordinary temperature (e.g., 23° C.) to the high temperature (e.g., 80° C.) and the resinous first and second plate parts 33a, 33b thermally expand, the bimetallic member 36 is deformed (bent) due to the difference of coefficient of liner expansions of the two metallic pieces 36a, 36b, as shown in FIG. 3B.

That is, the thermal expansion of the first and second plate parts 33a, 33b is absorbed by the deformation of the bimetallic member 36. Namely, a change of a distance between the first and second connecting points 33c, 33d due to thermal expansion of the first and second plate parts 33a, 33b is absorbed by the amount of deformation of the bimetallic member 36 in a longitudinal direction of the connecting plate 33. As such, the amount of the change of the distance between the first and second connecting points 33c, 33d is substantially zero or maintained within a predetermined range at least.

In FIG. 3A, a dimension L1 denotes a distance between the first connecting portion 33c and the second connecting portion 33d under the ordinary temperature. In FIG. 3B, a dimension L2 denotes a distance between the first connecting point 33c and the second connecting point 33d under the high temperature. Since the thermal expansion of the first and second plate parts 33a, 33b is absorbed by the deformation of the bimetallic member 36, the distance L2 is substantially equal to the distance L1.

As described above, the spaces are provided between the ends of the first and second plate parts 33a, 33b and the bimetallic member 36. Therefore, the bimetallic member 36 easily deforms with heat.

Figure 4:
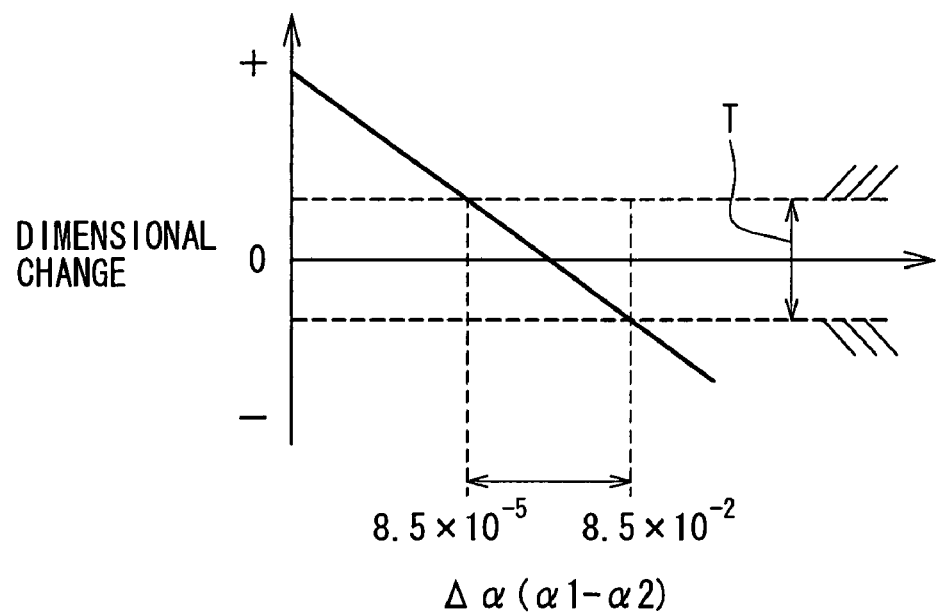
FIG. 4 is a graph showing a relationship between a difference of coefficients of liner expansion of two metallic pieces of a bimetallic member and the amount of change of dimension of the connecting plate according to the first embodiment.

The coefficients of liner expansion of the bimetallic member 36 is studied as shown in FIG. 4. Here, the first metallic piece 36a has a coefficient $\alpha 2$ of liner expansion, and the second metallic piece 36b has a coefficient $\alpha 1$ of liner expansion. FIG. 4 shows a relationship between a difference $\Delta\alpha(=\alpha 1-\alpha 2)$ of the coefficients of liner expansion of the first and second metallic pieces 36a, 36b and the amount of change of the distance between the first and second connecting points 33c, 33d, such as a dimensional change of the connecting plate 33, that is, a difference between the distance L1 and the distance L2, when the connecting plate 33 is heated.

When the difference $\Delta\alpha$ is zero, that is, when the first and second metallic pieces 36a, 36b have the same coefficient of liner expansion, the amount of change of the distance is the maximum on a plus side because the change of the distance is mainly dominated by the thermal expansion of the resin. That is, when the difference $\Delta\alpha$ is zero, since the bimetallic member 36 does not deform, the thermal expansion of the first and second plate parts 33a, 33b is not absorbed by the bimetallic member 36. As such, the distance L2 is larger than the distance L1.

As the difference $\Delta\alpha$ increases, the amount of change of the distance linearly reduces. When the difference $\Delta\alpha$ is on a level in which the amount of deformation of the bimetallic member 36 is equal to the amount of thermal expansion of the resinous first and second plate parts 33a, 33b, the amount of change of the distance is zero. As the difference $\Delta\alpha$ further increases, the amount of change of the distance reduces lower than zero. That is, the distance L2 becomes smaller than the distance L1.

To design the connecting plate 33, it is preferable that the amount of change of the distance is within a tolerant range (a range T in FIG. 4). Actually, a range of the difference $\Delta\alpha$ is determined in view of the shape of the connecting plate 33 and the coefficient of liner expansions of the resin. In the example shown in FIG. 3, it is preferable that the difference $\Delta\alpha$ is at least $8.5\times10^{-5}$ and at most $8.5\times10^{-2}$.

In the first embodiment, the connecting plate 33 has the bimetallic member 36 as the thermal deformation absorbing part. Therefore, the dimensional change of the connecting plate 33 due to thermal expansion of the first and second plate parts 33a, 33b is absorbed by the deformation of the bimetallic member 36. Namely, the distance between the first and second connecting points 33c, 33d is maintained substantially equal or within the predetermined range at least, even when the connecting plate 33 is heated. Accordingly, stress to the associated members will be reduced. It is less likely that the operation of the doors 16, 29 will be affected by the dimensional change of the connecting plate 33 when heated.

The end of the first plate part 33a is connected to the substantially middle position of the first metallic piece 36a with respect to the length of the first metallic piece 36a and the end of the second plate part 33b is connected to the ends of the second metallic piece 36b with respect to the length of the second metallic piece 36b. Therefore, the bimetallic member 36 is effectively deformed. Accordingly, the thermal expansion of the resinous first and second plate parts 33a, 33b are effectively absorbed by the thermal deformation of the bimetallic member 36.

Second Embodiment

Figures 5A, 5B:
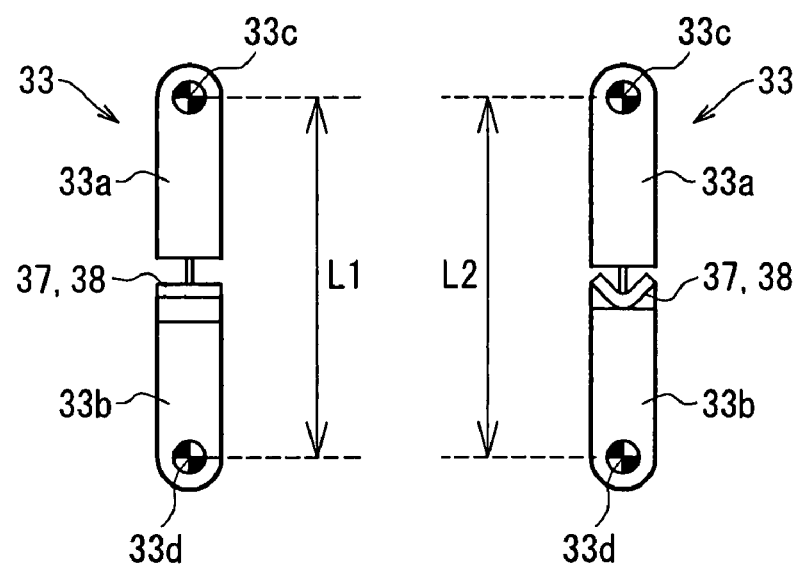
FIG. 5A is a schematic plan view of a connecting plate of a linking device, under ordinary temperature, according to a second embodiment of the present invention.
FIG. 5B is a schematic plan view of the connecting plate, under high temperature, according to the second embodiment.

A second embodiment will be described with reference to FIGS. 5A and 5B. FIG. 5A shows the connecting plate 33 of the second embodiment under the ordinary temperature and FIG. 5B shows the connecting plate 33 of the second embodiment under the high temperature.

In the second embodiment, the thermal deformation absorbing part is constructed of a shape memory member 37, 38, in place of the bimetallic member 36 of the first embodiment. For example, the shape memory member is formed of a shape memory alloy 37 or a shape memory resin 38.

The shape memory alloy 37 has a characteristic that returns to an original shape by heat after it is deformed, such as Ni—Ti alloy as well-known. The shape memory resin 38 has the similar future that returns to an original shape by heat after it is deformed. The shape memory resin 38 is, for example, polyester, polyurethane, styrene-butadiene, polynorbornene, trans-polyisoprene, or the like.

The end of the first plate part 33a is connected to the substantially middle portion of a first side of the shape memory member 37, 38, and the end of the second plate part 33b is connected to the ends of a second side of the shape memory member 37, 38. Also, the spaces are maintained between the shape memory member 37, 38 and the end of each of the first and second plate parts 33a, 33b.

When the ambient temperature exceeds a predetermined temperature (e.g., 60° C.), the shape memory member 37, 38 has shape shown in FIG. 5B. Thus, the change of distance between the first and second connecting points 33c, 33d due to thermal expansion of the resinous first and second plate parts 33a, 33b is absorbed by the deformation of the shape memory member 37, 38. Namely, the distance L2 of the plate member 33 under high temperature is substantially equal to the distance L1 under ordinary temperature.

Since the shape memory member 37, 38 is connected to the first and second plate parts 33a, 33b in the similar manner as the first embodiment, the shape memory member 37, 38 easily changes its shape. Accordingly, the change of distance due to the thermal expansion of the resinous plate portions 33a, 33b is effectively absorbed by the shape memory member 37, 38.

Third Embodiment

Figure 6A:
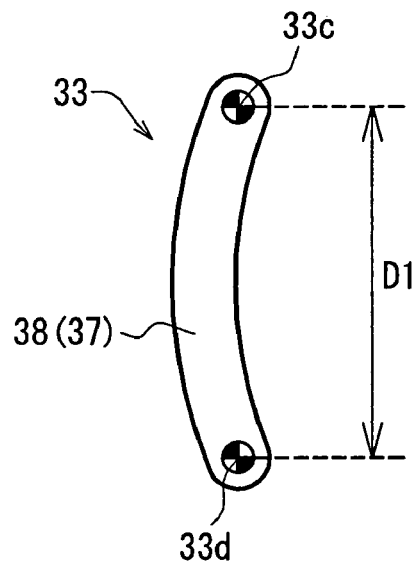
FIG. 6A is a schematic plan view of a connecting plate of a linking device, under ordinary temperature, according to a third embodiment of the present invention.

A third embodiment will be described with reference to FIGS. 6A and 6B. In the third embodiment, the connecting plate 33 is entirely made of a shape memory material such as the shape memory alloy 37 or the shape memory resin 38 of the second embodiment. FIG. 6A shows the connecting plate 33 under ordinary temperature, and FIG. 6B shows the plate member 33 under high temperature.

Figure 6B:
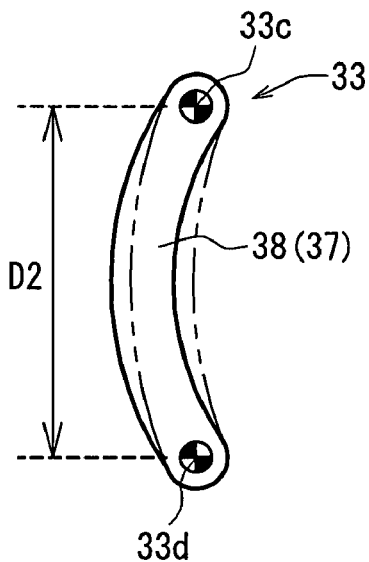
FIG. 6B is a schematic plan view of the connecting plate, under high temperature, according to the third embodiment of the present invention.
Figure 7A:
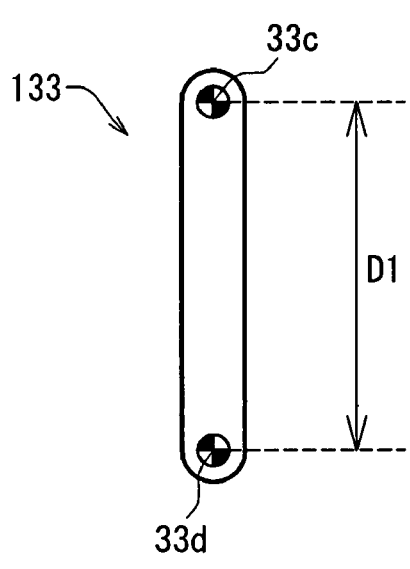
FIG. 7A is a schematic plan view of a connecting plate of a linking device, under ordinary temperature, according to a related art.
Figure 7B:
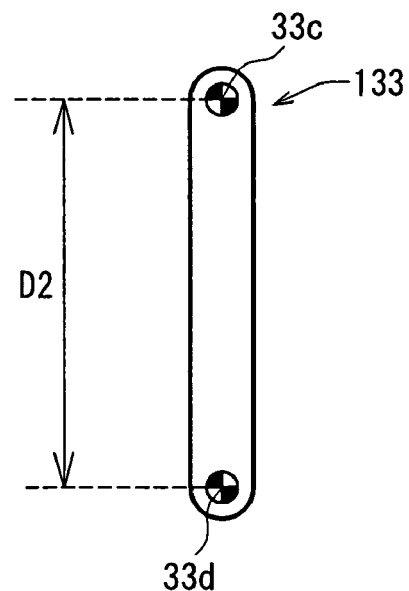
FIG. 7B is a schematic plan view of the connecting plate shown in FIG. 7A, under high temperature.

As shown in FIGS. 6A and 6B, the connecting plate 33 changes its shape entirely with the ambient temperature so that the distance L2 under the high temperature is substantially equal to the distance L1. As such, the change of the distance between the first and second connecting points 33c, 33d is absorbed by the entire deformation of the connecting plate 33. In other words, even when the connecting plate 33 is heated, the distance between the first and second connecting points 33c, 33d is generally maintained.

For example, the connecting plate 33 has a bent shape, such as a substantially arc shape or a substantially V shape. Therefore, the distance L1 is maintained by deforming the entire part of the connecting plate 33 effectively throughout the length. Also, the stress applied to the air mixing door lever 32, the heated air bypass door lever 35 and the like will be reduced by the curved shape of the connecting plate 33.

In a case that the connecting plate 33 is made of the shape memory alloy 37 and has the shape shown in FIGS. 6A and 6B, the rigidity and weight of the connecting plate 33 are greater than those of the connecting plate 33 that is made of the shape memory resin 38. Also, the costs will increase. In this case, therefore, the connecting plate 33 may have a thin rod shape.

Also, it is not always necessary that the connecting plate 33 has a uniformly deformable shape. For example, the connecting plate 33 may have a portion between the first and second connecting points 33c, 33d, the portion being deformable more than the other portion due to heat.

Modifications

In the above embodiment, the thermal deformation absorbing part or the thermal deformation absorbing structure are employed to the connecting plate 33 that connects the first rotation plate 31 and the second rotation plate 34. However, the thermal deformation absorbing part and the thermal deformation absorbing structure may be employed to the other linking members such as the air mixing door lever 32, heated air bypass door lever 35, the motor lever 31 and the intermediate plate 34.

Further, the thermal deformation absorbing part or the thermal deformation absorbing structure may be employed to a linking device for air conditioning units used for purposes other than vehicles.

Furthermore, the thermal deformation absorbing part or the thermal deformation absorbing structure may not be limited to a connecting member of a linking device used for any purposes other than air conditioning units. For example, the thermal deformation absorbing part or the thermal deformation absorbing structure may be employed in any linking devices for driving objects, which is used in a condition in which the ambient temperature changes.

Additional advantages and modifications will readily occur to those skilled in the art. The invention in its broader term is therefore not limited to the specific details, representative apparatus, and illustrative examples shown and described.

What is claimed is:

1. A linking device for operating doors of an air conditioning unit, comprising:
    a first rotation member directly connected to a first air door lever;
    a second rotation member directly connected to a second air door lever; and
    a connecting member connecting the first rotation member and the second rotation member, wherein
    the connecting member includes a first connecting portion connected to the first rotation member, a second connecting portion connected to the second rotation member and a thermal deformation absorbing part between the first connecting portion and the second connecting portion,
    the thermal deformation absorbing part is configured to absorb a change of distance between the first and second connecting portions due to thermal deformation.

2. The linking device according to claim 1, wherein the thermal deformation absorbing part is constructed of a bi-metallic member.

3. The linking device according to claim 1, wherein the thermal deformation absorbing part is constructed of a shape memory alloy.

4. The linking device according to claim 1, wherein the thermal deformation absorbing part is constructed of a shape memory resin.

5. The linking device according to claim 1, wherein
    the connecting member includes a first connecting part and a second connecting part,
    the first connecting portion is included in the first connecting part,
    the second connecting portion is included in the second connecting part,
    the thermal deformation absorbing part is disposed between the first connecting part and the second connecting part,
    an end of the first connecting part is connected to a substantially middle portion of a first side of the thermal deformation absorbing part with respect to a length of the thermal deformation absorbing part, and an end of the second connecting part is connected to ends of a second side of the thermal deformation absorbing part with respect to the length of the thermal deformation absorbing part.

6. The linking device according to claim 5, wherein the thermal deformation absorbing part is provided by a bi-metallic member having a first metallic piece and a second metallic piece that has a coefficient of liner expansion larger than that of the first metallic piece, the first metallic piece is disposed on the first side of the thermal deformation absorbing part and the second metallic piece is disposed on the second side of the thermal deformation absorbing part.

7. The linking device according to claim 1, further comprising:
a driving device for outputting a driving force, wherein
at least one of the first rotation member, the second rotation member and the connecting member is connected to the driving device for receiving the driving force and transmitting the driving force to at least one other of the first rotation member, the second rotation member and the connecting member.

8. A linking device for operating doors of an air conditioning unit, comprising:
a first rotation member directly connected to a first air door lever;
a second rotation member directly connected to a second air door lever; and
a connecting member including a first connecting point connected to the first rotation member and a second connecting point connected to the second rotation member, wherein the connecting member is made of a shape memory material and is capable of changing its shape with heat while maintaining a distance between the first connecting point and the second connecting point.

9. The linking device according to claim 8, wherein the shape memory material is a shape memory alloy.

10. The linking device according to claim 8, wherein the shape memory material is a shape memory resin.

11. The linking device according to claim 8, wherein a portion of the connecting member between the first connecting point and the second connecting point has a bent shape.

12. A linking device for transmitting a driving force to objects to be driven, the linking device comprising:
a first linking member for transmitting the driving force toward at least one of the objects;
a second linking member for transmitting the driving force toward at least another one of the objects; and
a third linking member for connecting the first linking member and the second linking member, wherein
the third linking member includes a first connecting part, a second connecting part and a thermal deformation absorbing part between the first connecting part and the second connecting part,
the first connecting part includes a first connecting point and is connected to the first linking member at the first connecting point,
the second connecting part includes a second connecting point and is connected to the second linking member at the second connecting point, and
the thermal deformation absorbing part is deformable with heat and is configured to absorb a change of a distance between the first and second connecting points due to thermal deformation of the first and second connecting parts by deformation thereof; wherein
the first connecting part has an end spaced from a first side of the thermal deformation absorbing part, and further includes a first extension extending from the end and connecting to a substantially middle portion of the first side of the thermal deformation absorbing part with respect to a length of the thermal deformation absorbing part across a space, and
the second connecting part has an end spaced from a second side of the thermal deformation absorbing part, and further includes a second extension and a third extension that extend from the end and connect to separated ends of the second side of the thermal deformation absorbing part with respect to the length of the thermal deformation absorbing part across a space.

* * * * *